(12) United States Patent
Lee et al.

(10) Patent No.: US 11,592,070 B2
(45) Date of Patent: Feb. 28, 2023

(54) GAS CYLINDER AND GAS SPRING FOR PREVENTING GAS LEAKAGE, AND METHOD FOR MANUFACTURING SAME

(71) Applicant: SAMHONGSA CO., LTD., Seoul (KR)

(72) Inventors: Ki Cheol Lee, Incheon (KR); Jin Hyung An, Incheon (KR)

(73) Assignee: SAMHONGSA CO., LTD., Seoul (KR)

( * ) Notice: Subject to any disclaimer, the term of this patent is extended or adjusted under 35 U.S.C. 154(b) by 118 days.

(21) Appl. No.: 16/979,716

(22) PCT Filed: Mar. 12, 2019

(86) PCT No.: PCT/KR2019/002844
§ 371 (c)(1),
(2) Date: Sep. 10, 2020

(87) PCT Pub. No.: WO2019/177339
PCT Pub. Date: Sep. 19, 2019

(65) Prior Publication Data
US 2021/0041004 A1    Feb. 11, 2021

(30) Foreign Application Priority Data
Mar. 12, 2018   (KR) .......................... 10-2018-0028846

(51) Int. Cl.
*F16F 9/36* (2006.01)
*F16F 9/32* (2006.01)
(Continued)

(52) U.S. Cl.
CPC .............. *F16F 9/3235* (2013.01); *F16F 9/36* (2013.01); *F15B 15/1447* (2013.01);
(Continued)

(58) Field of Classification Search
CPC ........ F16F 9/0209; F16F 9/0281; F16F 9/062; F16F 9/3235; F16F 9/3242; F16F 9/3257; F16F 9/369; F16F 9/36; A47C 3/30
See application file for complete search history.

(56) References Cited

U.S. PATENT DOCUMENTS

| 3,256,005 | A | * | 6/1966 | Hollis | ........................ F16F 5/00 |
| | | | | | 277/558 |
| 4,844,392 | A | * | 7/1989 | Bauer | ...................... A47C 3/30 |
| | | | | | 248/162.1 |

(Continued)

FOREIGN PATENT DOCUMENTS

| JP | 2006-170444 A | 6/2006 |
| JP | 2007-085377 A | 4/2007 |

(Continued)

OTHER PUBLICATIONS

International Search Report and Written Opinion mailed in International Patent Application No. PCT/KR2019/002844 filed Dec. 3, 2019, 10 pages.

(Continued)

*Primary Examiner* — Nicholas J Lane
(74) *Attorney, Agent, or Firm* — Kilpatrick Townsend & Stockton LLP

(57) ABSTRACT

A method of manufacturing a gas cylinder according to an embodiment of the present invention may include applying a sealant to at least a portion of inner surface of a hollow spindle; inserting a cylinder assembly contacting the inner surface of the spindle through an inlet of the spindle and forming a sealant film on an inner surface of the spindle by frictionally applying the sealant to the inner surface of the spindle; and hardening the sealant film to form a cured film cylinder in contact with the inner surface of the spindle.

10 Claims, 24 Drawing Sheets

(51) Int. Cl.
*F15B 15/14* (2006.01)
*F16F 9/02* (2006.01)

(52) U.S. Cl.
CPC ......... *F15B 15/1457* (2013.01); *F16F 9/0209* (2013.01); *F16F 9/3257* (2013.01); *F16F 9/369* (2013.01); *F16F 2234/02* (2013.01)

(56) References Cited

U.S. PATENT DOCUMENTS

| | | | | |
|---|---|---|---|---|
| 5,511,759 | A | * | 4/1996 | DeKraker ............. F16F 9/3228 248/575 |
| 6,056,251 | A | * | 5/2000 | Knopp ..................... A47C 3/30 108/150 |
| 2003/0116012 | A1 | * | 6/2003 | Mickelson .......... F15B 15/1438 92/164 |
| 2004/0124570 | A1 | * | 7/2004 | Huh ...................... F16F 9/0263 267/64.12 |
| 2006/0163784 | A1 | * | 7/2006 | Yamamoto ............. F16F 13/10 267/140.13 |
| 2021/0339990 | A1 | * | 11/2021 | Yoo ........................ A47B 21/02 |

FOREIGN PATENT DOCUMENTS

| | | |
|---|---|---|
| JP | 2009-058051 A | 3/2009 |
| KR | 1994-0009222 B1 | 10/1994 |
| KR | 2014-0103076 A | 8/2014 |

OTHER PUBLICATIONS

Written Decision on Registration dated Jul. 16, 2019 in Korean Patent Application No. 2018-0028846, filed Mar. 19, 2018, all pages.

* cited by examiner

GAS CYLINDER AND GAS SPRING FOR PREVENTING GAS LEAKAGE, AND METHOD FOR MANUFACTURING SAME

TECHNICAL FIELD

Embodiment of the present invention relates to a gas cylinder, a gas spring and a method of manufacturing the same for preventing an internal compressed gas for driving the gas cylinder or the gas spring, from leaking out.

BACKGROUND ART

A gas cylinder or gas spring is a device that can fix or apply force to a cylinder to a desired length using hydraulic pressure. The inside of the gas cylinder or gas spring is usually filled with high-pressure nitrogen ($N_2$) gas, and a gas flow is controlled by opening and closing an orifice through a gas open pin or valve, thereby adjusting the overall length of the gas cylinder or gas spring.

Herein, since the gas cylinder or the gas spring performs properly only when the pressure inside the cylinder is maintained, the gas cylinder or the gas spring has a sealing system including a plurality of O-rings to prevent gas from leaking to the outside.

DESCRIPTION OF EMBODIMENTS

Technical Problem

In the manufacturing process of a spindle or a cylinder constituting a gas cylinder or a gas spring, a long scratch or a pin hole is often formed on an inner surface. Such scratches or pinholes are not visible to the naked eye, but are a cause of being provided as a passage through which gas inside the manufactured gas cylinder or gas spring leaks out. Accordingly, a gas spindle or gas spring having a spindle or cylinder in which a scratch or pin hole is formed has a problem in that an internal gas pressure decreases as time passes.

However, these problems are exemplary, and the scope of the present invention is not limited thereby.

Technical Solution to Problem

A method of manufacturing a gas cylinder according to an embodiment of the present invention may include applying a sealant to at least a portion of inner surface of a hollow spindle; forming a sealant film on an inner surface of the spindle by frictionally applying the sealant to the inner surface of the spindle; and hardening the sealant film to form a cured film cylinder in contact with the inner surface of the spindle.

According to one embodiment, the method of manufacturing a gas cylinder may further include inserting a cylinder assembly contacting the inner surface of the spindle through an inlet of the spindle, and after the forming of the sealant film, an applying of the sealant to a lower portion of the inserted cylinder assembly may be further performed.

According to one embodiment, the method of manufacturing a gas cylinder may further include after the forming of the sealant film, inserting an open holder into the spindle to be coupled with the cylinder assembly and the spindle; and applying a sealant to a boundary between one end of the open holder and the inner surface of the spindle.

According to one embodiment, the method of manufacturing a gas cylinder may further include after the applying of the sealant to a boundary between one end of the open holder and the inner surface of the spindle, inserting a gas sealing member into the spindle; and applying the sealant to a boundary between one end of the gas sealing member and the inner surface of the spindle.

A method of manufacturing a gas cylinder according to another embodiment of the present invention may include applying a sealant to a first region of an inner surface of a hollow spindle; inserting a cylinder assembly in contact with the inner surface of the spindle into the spindle; applying the sealant to a second region of the inner surface of the spindle; and hardening the sealant applied to the first region and the second region to form a first cured film ring and a second cured film ring in contact with the inner surface of the spindle.

A gas cylinder according to an embodiment of the present invention may include a hollow spindle; a cured film cylinder in contact with an inner surface of the spindle and formed by hardening a sealant; and a cylinder assembly including a cylinder spaced apart from at least a partial region of an inner surface of the cured film cylinder.

A gas cylinder according to an embodiment of the present invention may include a hollow spindle; a first cured film ring and a second cured film ring placed in a first region and a second region of the spindle inner surface, respectively, and formed by hardening a sealant; and a cylinder assembly placed between the first cured film ring and the second cured film ring in the spindle.

According to an embodiment, the gas cylinder may further include a tapered holder placed within a tapered interior of the spindle, wherein the first cured film ring is located at a boundary between the tapered holder and the cylinder assembly.

According to an embodiment, the gas cylinder may further include an open holder coupled with the cylinder assembly at an inlet of the spindle, wherein the second cured film ring is located at a boundary between the open holder and the spindle.

A method of manufacturing gas cylinder according to an embodiment of the present invention may include inserting a piston rod assembly in contact with an inner surface of a cylinder into the hollow cylinder; applying a sealant to an inlet portion of the inner surface of the cylinder; inserting a gas sealing member into the inner surface of the cylinder; and hardening the sealant to form a cured film ring in contact with the inner surface of the spindle and the gas sealing member.

A gas spring according to an embodiment of the present invention may include a hollow cylinder; a piston rod assembly capable of reciprocating motion within the cylinder; a spacer placed inside the cylinder to limit movement of the piston rod assembly; a gas sealing member placed inside the cylinder and in contact with the spacer; a flange in contact with the gas sealing member and blocking an inlet of the cylinder; and a cured film ring placed between the spacer and the gas sealing member or between the gas sealing member and the flange and formed by curing a sealant to block a gas outlet passage.

Other aspects, features, and advantages other than those described above will become apparent from the following drawings, claims, and detailed description of the invention.

Advantageous Effects of Disclosure

According to the gas cylinder and the manufacturing method of the gas cylinder according to an embodiment of the present invention, by blocking the gap between the upper and lower parts of the cylinder assembly through the cured film cylinder and/or cured film ring, gas leakage from the chamber between the cylinder and spindle is prevented, thereby minimizing a phenomenon that a pressure inside the cylinder decreases over time. The scope of the present invention is not limited by these effects.

BEST MODE

Figure 1:
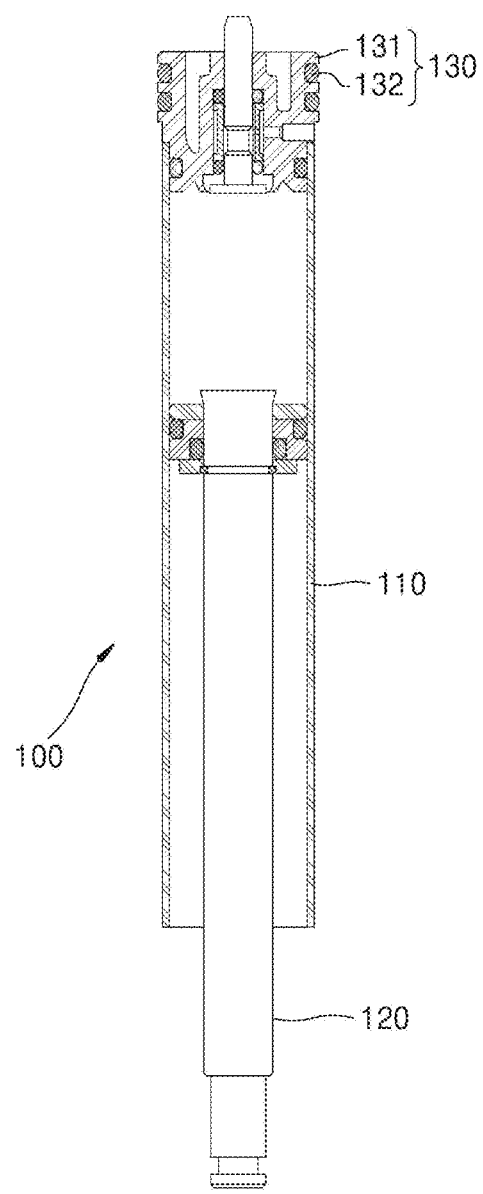
FIGS. 1 and 2 are cross-sectional views of a cylinder assembly 100 and a spindle 200 included in a gas cylinder according to an embodiment of the present invention, respectively.

Since the present invention may be variously modified and has various embodiments, specific embodiments are illustrated in a drawings and described in a detailed description. Effects and features of the present invention, and a method of achieving them will be apparent with reference to the embodiments described later in detail together with the drawings. However, the present invention is not limited to the embodiments disclosed below and may be implemented in various forms.

In the following embodiments, terms such as first and second are not used in a limiting meaning, but are used for the purpose of distinguishing one component from another component.

In the following examples, the singular expression includes the plural expression unless the context clearly indicates otherwise.

In the following embodiments, terms such as 'include' or 'have' means that the features or elements described in the specification are present, and do not preclude the possibility of adding one or more other features or elements in advance.

In the following embodiments, when a portion of a film, a region, a component is said to be 'over' or 'on' another portion, this includes not only the case directly on the other part, but also the case where another film, region, or component is interposed in the middle.

When a certain embodiment may be implemented differently, certain steps may be performed differently from the described order. For example, two steps described in succession may be performed substantially simultaneously, or may be performed in an order opposite to the described order.

In the drawings, components may be exaggerated or reduced in size for convenience of description. For example, the size and thickness of each component shown in the drawings are arbitrarily shown for convenience of description, and the present invention is not necessarily limited to what is shown.

Figure 2:
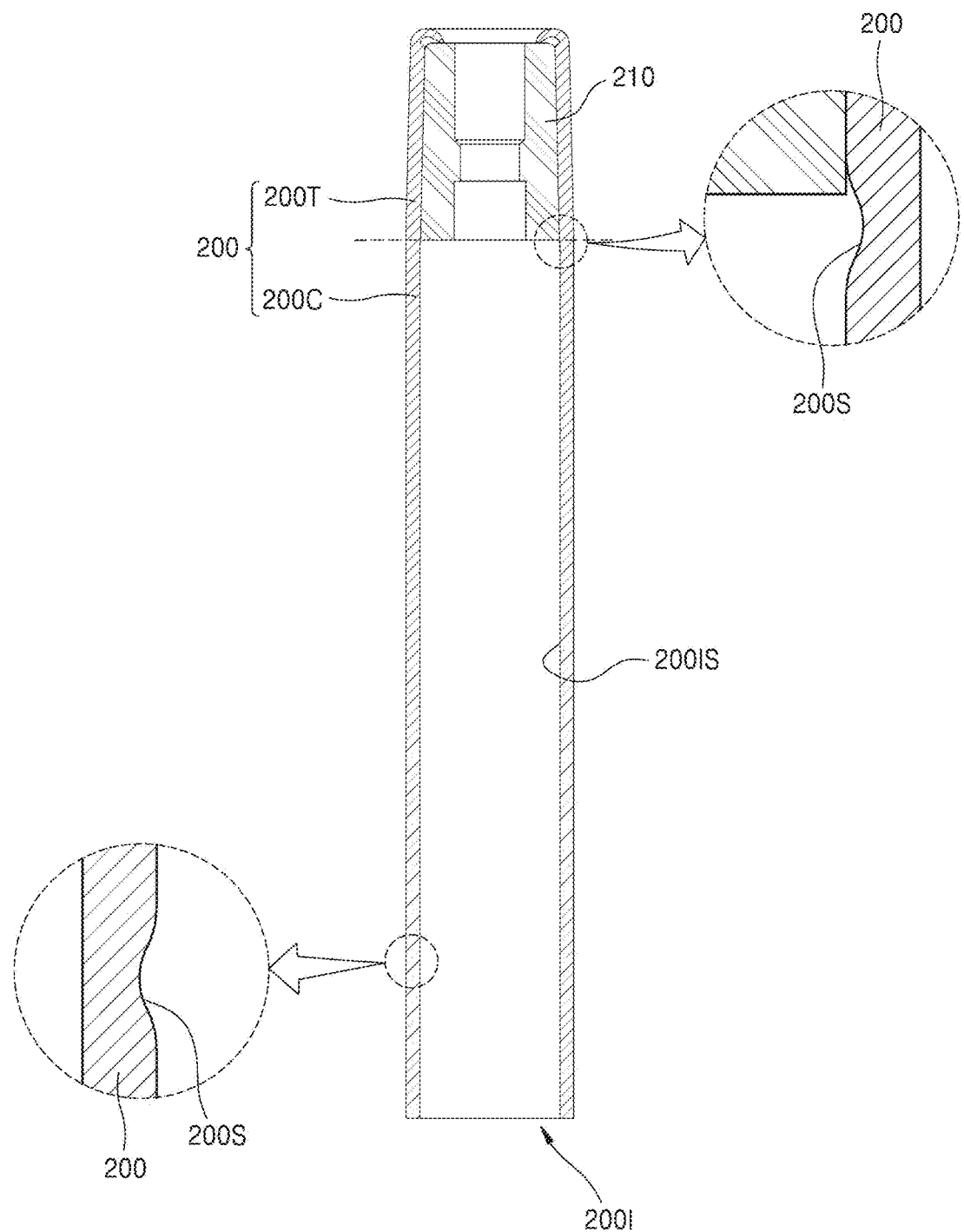

FIGS. 1 and 2 are cross-sectional views of a cylinder assembly 100 and a spindle 200 included in a gas cylinder assembly according to an embodiment of the present invention, respectively.

Referring to FIG. 1, the cylinder assembly 100 may include a cylinder 110, a piston rod 120, and a pipe holder assembly 130. The cylinder 110 is a hollow tube, and provides a space in which compressed gas such as nitrogen can be filled. The piston rod 120 may reciprocate by hydraulic pressure inside the cylinder 110. The piston rod 120 may be placed along a central axis of the cylinder 110. The outer surface of one end of the piston rod 120 may be surrounded by a piston washer, a spring ring, a holder, and the like, and a detailed description thereof is omitted.

Referring to FIG. 1, the pipe holder assembly 130 is coupled to the upper portion of the cylinder 110. The pipe holder assembly 130 may block one end of the cylinder 110 to seal the gas inside the cylinder 110. The pipe holder assembly 130 may include a pipe holder 131 and an O-ring 132. The pipe holder 131 and the O-ring 132 may protrude further in a radial direction than the cylinder 110. A description of other components constituting the pipe holder assembly 130 is omitted.

Referring to FIG. 2, the spindle 200 having a hollow tubular shape fixes the cylinder assembly 100 of FIG. 1 therein. The spindle 200 may include a cylindrical portion 200C that extends straight up and down in the cross-sectional view of FIG. 2 and a tapered portion 200T that is bent in a central axis direction at a predetermined angle with respect to the cylindrical portion 200C. One end of the tapered portion 200T may be curled so that a component placed inside the spindle 200 does not come out. A tapered holder 210 may be placed inside the tapered portion 200T. The tapered holder 210 may be inserted through an inlet 200I of the spindle 200 to be positioned in the tapered portion 200T.

Due to the problem of the raw material itself or the cause of foreign substances coming into contact with the mold inside the pipe during the pipe making/drawing process, a scratch 200S or a recess (pin hole) is often formed on a spindle inner surface 200IS during the manufacturing process of the spindle 200. In FIG. 2, it is exemplified that fine scratches 200S are formed on the upper and lower portions of the spindle 200, respectively. In FIG. 2, the size of the scratch 200S is enlarged for convenience of description. These scratches 200S or pinholes are not easily identified with the naked eye, but are a cause of providing a passage through which gas inside the manufactured gas cylinder leaks out. An embodiment of the present invention provides a gas cylinder and a method of manufacturing a gas cylinder to solve this problem.

FIGS. 3 to 12 are cross-sectional views sequentially showing a method of manufacturing a gas cylinder according to an embodiment of the present invention.

A method of manufacturing a gas cylinder according to an embodiment of the present invention includes a step of applying a sealant S, a step of inserting the cylinder assembly 100 and forming a sealant film 301', and a step of hardening.

Figure 3:
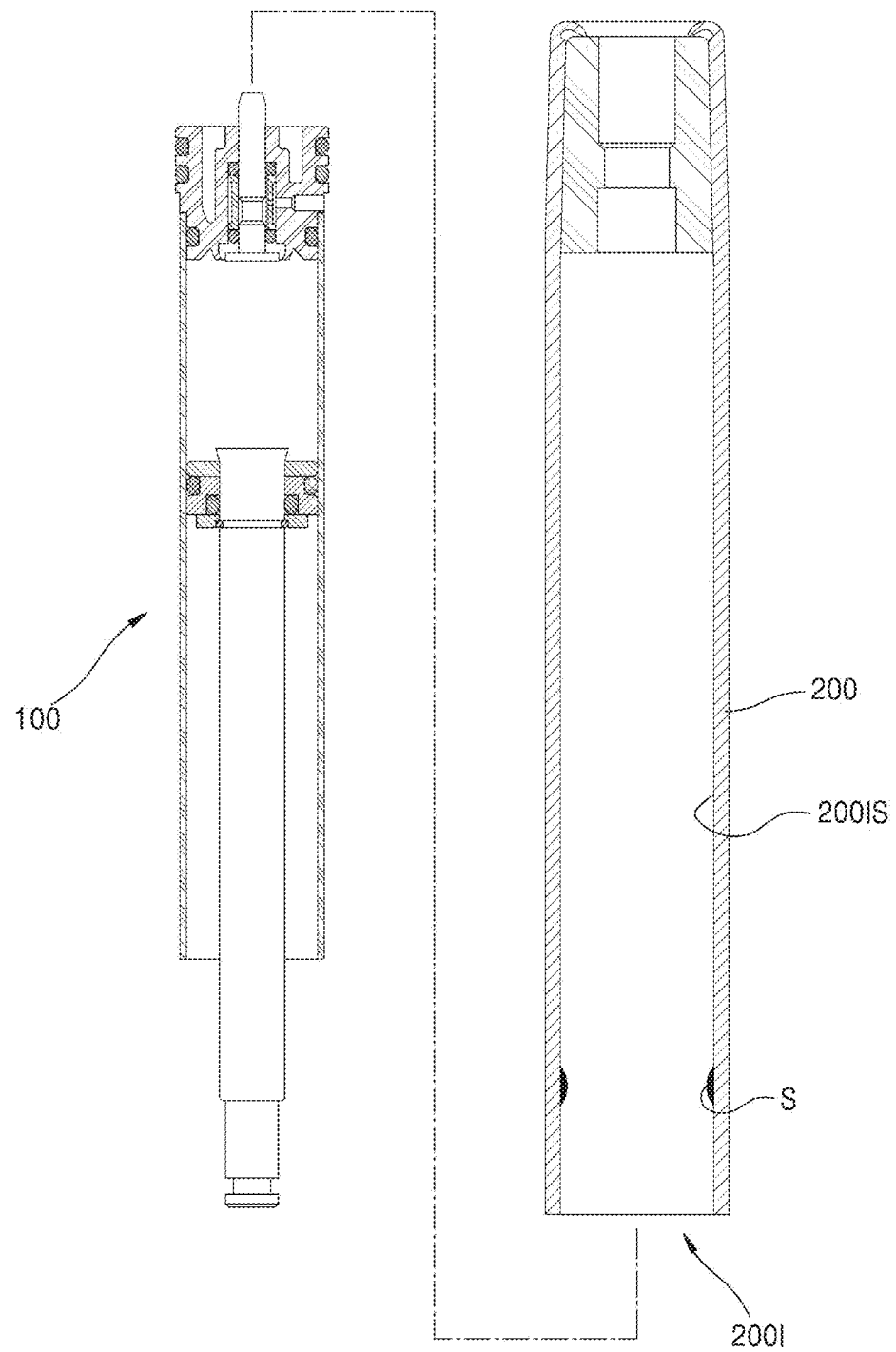
FIGS. 3 to 12 are cross-sectional views sequentially showing a method of manufacturing a gas cylinder according to an embodiment of the present invention.

Referring to FIG. 3, a step of applying a liquid sealant S to at least a portion of a previously manufactured inner surface 200IS of the spindle is performed. The sealant S may be an anaerobic resin that is in a liquid state and then hardens and solidifies when air is blocked. The sealant S may include, for example, a polyester resin such as methacrylate ester or a fluorine resin such as polytetrafluoroethylene (PTFE), but the present invention is not limited thereto.

The sealant S may be applied in the form of a ring along the inner surface 200IS of the spindle 200 at a predetermined distance from the inlet 200I of the spindle 200, but the present invention is not limited thereto. In one embodiment, the sealant S may be applied at a distance of 5 to 10 mm from the inlet 200I of the spindle 200. The sealant S may be applied about 1 cc to 3 cc, but the present invention is not limited thereto.

The tapered holder 210 may be inserted into the spindle 200 before or immediately after the sealant S is applied. In FIG. 3, it is illustrated that the sealant S is applied to the inside of the spindle 200 in which the tapered holder 210 is already inserted.

Figure 4:
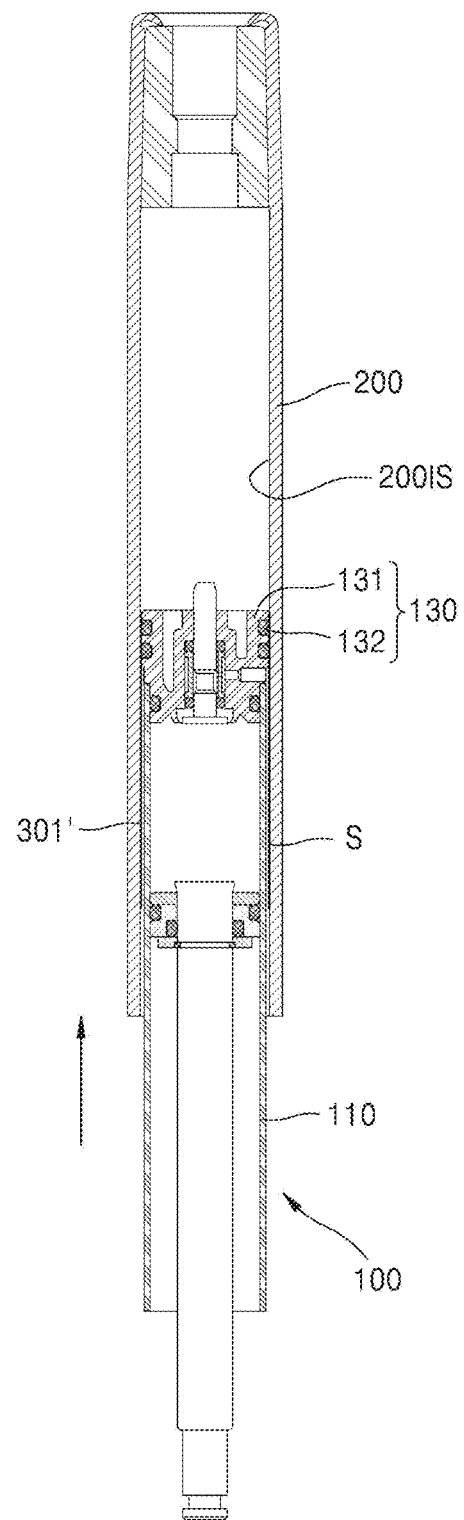

Referring to FIG. 4, the step of inserting the cylinder assembly 100 into an inlet of the spindle 200 after the sealant S is applied is performed. In this case, the width of the pipe holder assembly 130 included in the cylinder assembly 100 may be the same as the width (diameter) of the inner surface 200IS of the spindle. Accordingly, the pipe holder assembly 130 may contact the inner surface 200IS of the spindle. On the other hand, the cylinder 110 may be inserted in a state spaced apart from the inner surface 200IS of the spindle. The space between the cylinder 110 and the inner surface 200IS of the spindle provides a passage through which gas may pass when the gas cylinder is operated later.

Since the pipe holder assembly 130 is in contact with the inner surface 200IS of the spindle, when the cylinder assembly 100 is inserted into the spindle 200, the sealant S applied to the inner surface 200IS of the spindle may be rubbed and 'pushed in'. That is, the sealant S may be 'frictionally applied' on the inner surface 200IS of the spindle by the cylinder assembly 100.

Figure 5:
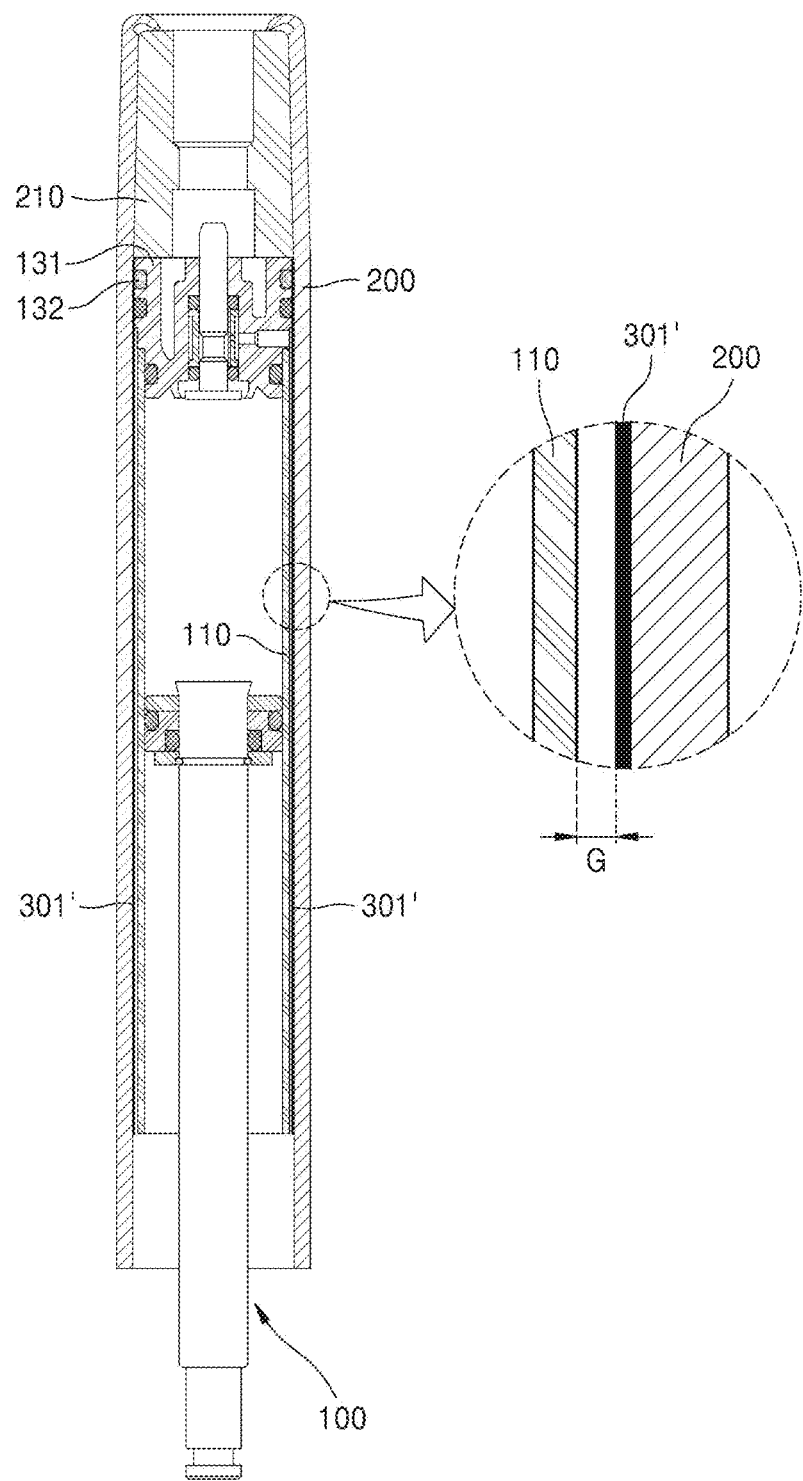

FIG. 5 shows a state in which the cylinder assembly 100 is fully inserted into the spindle 200. The liquid sealant S may be applied to the upper portion of the cylinder assembly 100, that is, to the boundary region between the pipe holder 131 and the tapered holder 210, based on FIG. 5. The sealant S frictionally applied by the cylinder assembly 100 may form a cylindrical sealant film 301'. That is, the cylindrical sealant film 301' is formed to surround the outer side of the cylinder 110.

Meanwhile, the sealant film 301' may not contact the cylinder 110. That is, a gap G may be formed between the sealant film 301' and the cylinder 110. As described above, the gap G provides a flow path through which gas may flow, wherein the gas is used to provide hydraulic pressure required for the cylinder assembly 100 to reciprocate.

Then, a step of applying a liquid sealant S to the lower portion of the inserted cylinder assembly 100 is performed. Herein, before and after the sealant S is applied, a step of inserting other components into the spindle may be performed.

Figure 6:
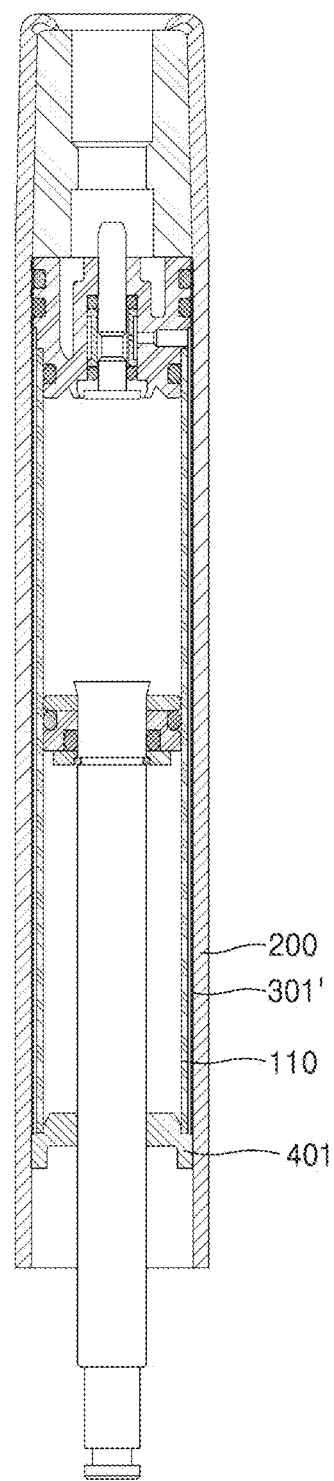

Referring to FIG. 6, after the cylinder assembly 100 is fully inserted into the spindle 200, the step of inserting an open holder 401 may be performed. The open holder 401 is a ring-shaped component having a center hole formed therein, and fixes the cylinder 110 inside the spindle 200 and provides a passage through which the piston rod 120 may reciprocate. The open holder 401 is placed at the lower portion of the cylinder 110 and contacts the inner surface 200IS of the spindle and is coupled to the cylinder assembly 100 and the spindle 200. Meanwhile, the sealant film 301' may be formed up to the boundary where the open holder 401 and the cylinder 110 contact each other.

According to an embodiment, after the sealant film 301' is formed, a step of applying a liquid sealant S to the inlet 200I of the spindle 200 may be performed.

Figure 7:
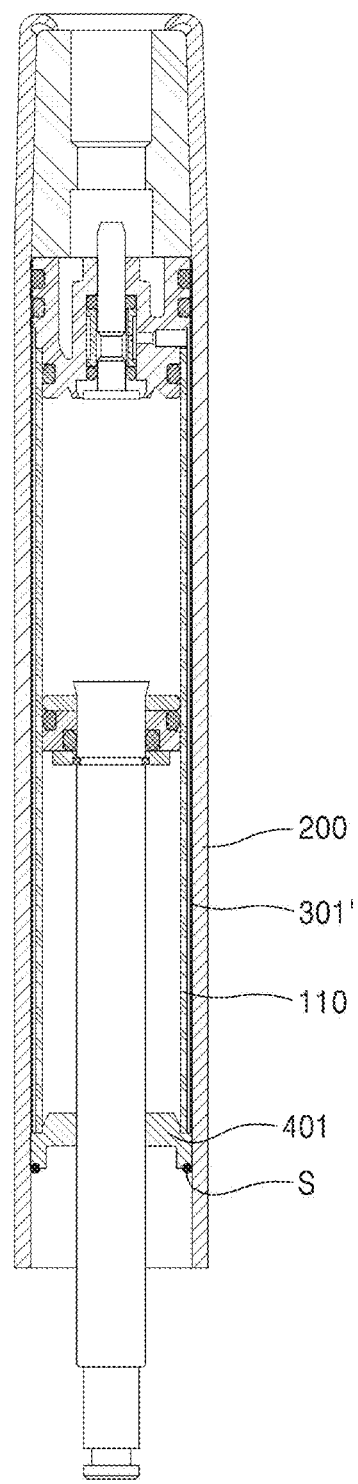

Referring to FIG. 7, a liquid sealant S may be applied to the inlet 200I of the spindle 200, for example, the lower boundary of the open holder 401. As a result, a small gap between a lower surface of the open holder 401 and a boundary line of the cylinder 110 may be filled with the sealant S.

Figure 8:
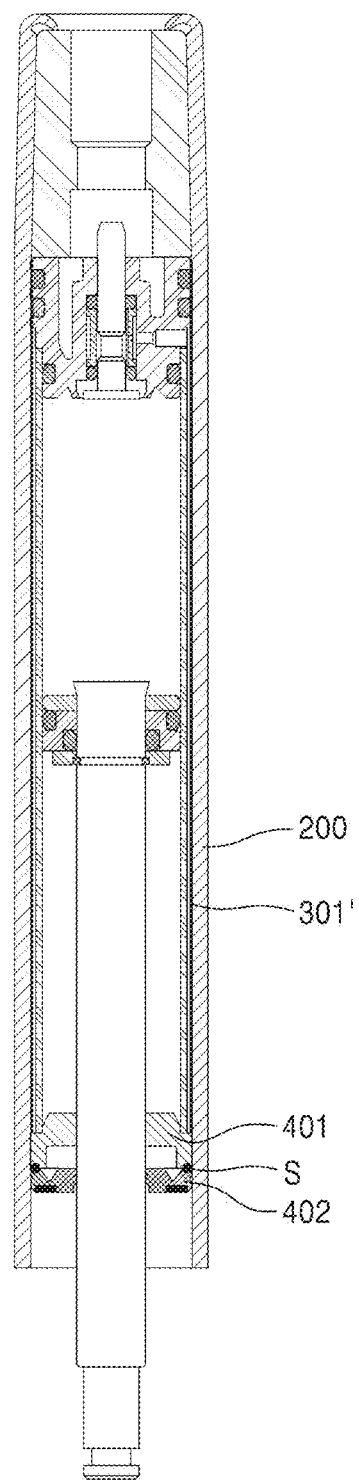

Referring to FIG. 8, a gas sealing member 402 may be inserted under the open holder 401. The gas sealing member 402 serves to block the entrance and exit of gas inside and outside of the spindle 200. The gas sealing member 402 also has a ring shape with a hole in the center, and the piston rod 120 may reciprocate through a hole formed in the gas sealing member 402.

Figure 9:
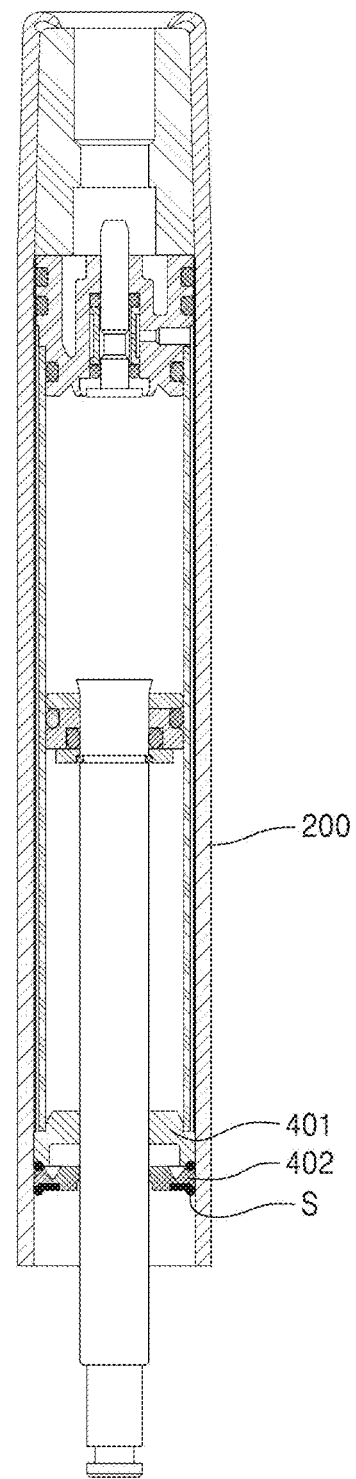

Referring to FIG. 9, a liquid sealant S may be applied to the lower boundary line of the gas sealing member 402. As a result, a small gap between the lower surface of the gas sealing member 402 and the boundary line of the cylinder 110 may be filled with the sealant S.

Figure 10:
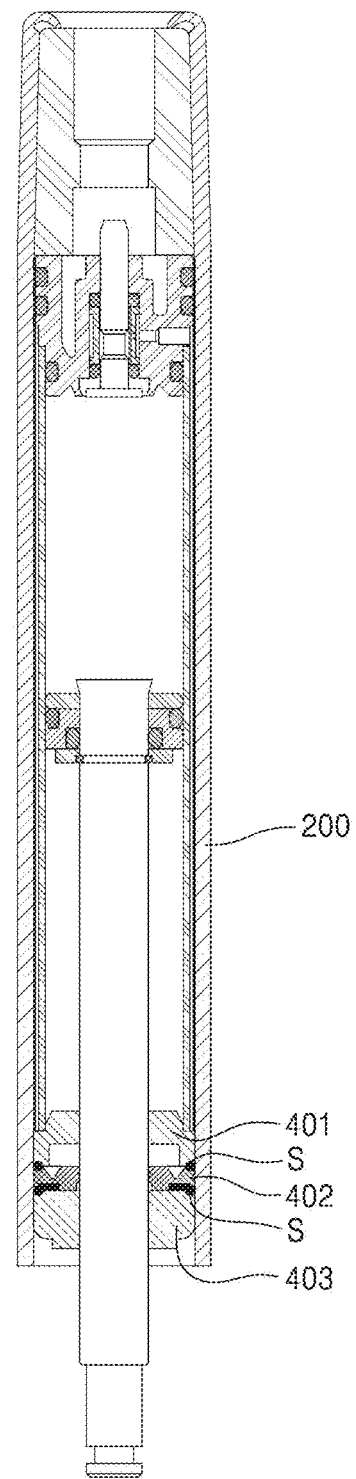
Figure 11:
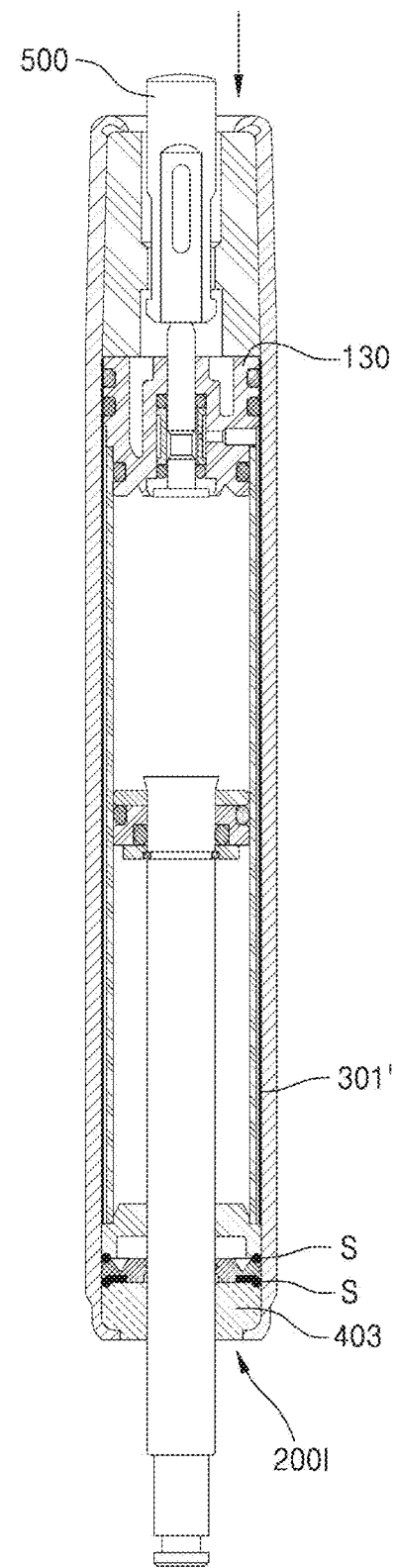

Referring to FIGS. 10 and 11, after a flange 403 is inserted under the gas sealing member 402, the region around the spindle inlet 200I may be curled to conform to the shape of the outer surface of the flange 403. Meanwhile, a gas open pin 500 for opening and closing an orifice formed in the pipe holder assembly 130 may be inserted into the opposite end of the spindle 200.

Then, a step of hardening the sealant film 301' and the sealant S is performed. Since the sealant film 301' and the sealant S are sealed by the flange 403 and the tapered holder 210, a hardening step may be performed under anaerobic conditions. The hardening step may be performed at room temperature for about 24 hours, but the present invention is not limited thereto.

Figure 12:
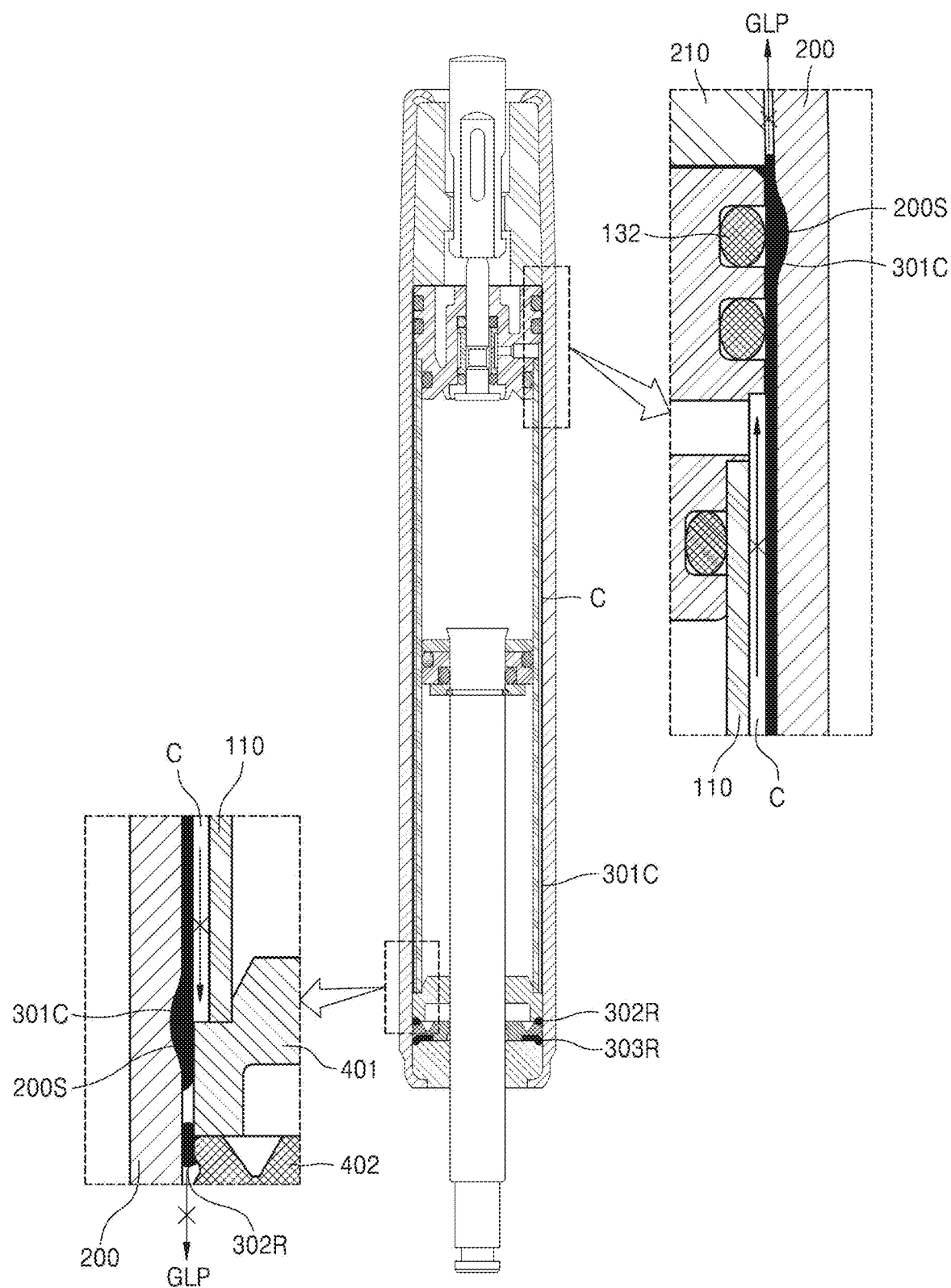

When the hardening step is completed, a solid cured film cylinder 301C is formed on the inner surface of the spindle 200 as shown in FIG. 12. In this case, referring to the enlarged top view of FIG. 12, the cured film cylinder 301C fills the gap between the outer surface of the pipe holder assembly 130 and the inner surface of the spindle 200IS due to the scratch 200S formed on the inner surface of the spindle 200IS and the gap between the outer surface of the taper holder 210 and the spindle 200. Accordingly, a gas leakage path (GLP) through which gas may leak is blocked by the cured film cylinder 301C. As a result, it is possible to prevent the gas in the chamber C between the spindle 200 and the cylinder 110 from leaking out through the GLP.

Meanwhile, referring to the enlarged bottom view of FIG. 12, even when the scratch 200S is formed on the inner surface 200IS of the spindle around the cylinder 110 and the open holder 401, the cured film cylinder 301C fills the gap formed by the scratch 200S. In addition, a cured film rings 302R and 303R hardened together with the cured film cylinder 301C during a hardening process double fill a gap formed between the gas sealing member 402 and the spindle 200. Accordingly, the upper gas outlet passage GLP is blocked by the cured film cylinder 301C, and the lower upper gas outlet passage is blocked by the cured film cylinder 301C and the cured film rings 302R and 303R. As a result, it is possible to prevent the gas in the chamber C between the spindle 200 and the cylinder 110 from leaking out through the gas outlet passage GLP.

On the other hand, in the enlarged view of FIG. 12, for convenience of explanation, the gaps between the spindle 200 and the taper holder 210, the cylinder assembly 100, the open holder 401, and the gas sealing member 402 are exaggerated than it actually is.

After the hardening process is completed, gas is injected into the cylinder 110 to complete the gas cylinder manufacturing process.

FIGS. 13 to 16 are cross-sectional views sequentially showing a method of manufacturing a gas cylinder according to another embodiment of the present invention.

Figure 13:
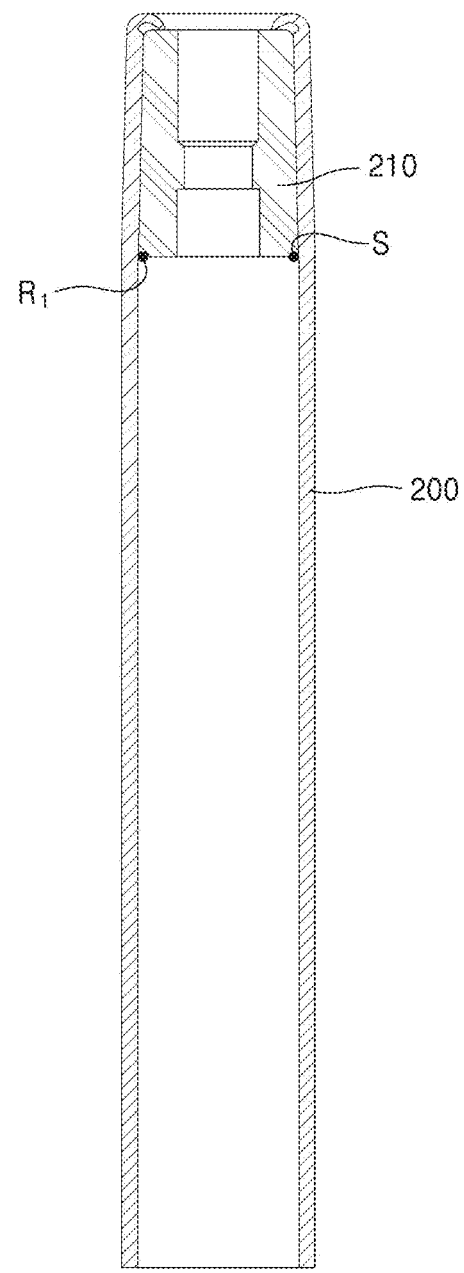
FIGS. 13 to 16 are cross-sectional views sequentially showing a method of manufacturing a gas cylinder according to another embodiment of the present invention.

A method of manufacturing a gas cylinder according to another embodiment of the present invention includes applying a liquid sealant S to the first region R1 of the inner surface 200IS of a hollow spindle, inserting the cylinder assembly 100, applying the liquid sealant S to the second region R2 of the inner surface 200IS of the spindle, and forming a cured film ring by hardening the sealant S, Referring to FIG. 13, first, a step of applying a liquid sealant S to the first region R1 of the inner surface 200IS of the hollow spindle is performed. The first region R1 may include a peripheral region of a point where the lower surface of the taper holder 210 and the spindle 200 contact each other. The sealant S may be applied to the first region R1 while the tapered holder 210 is already inserted into the spindle 200. Alternatively, the tapered holder 210 may be inserted after the sealant S is first applied to the first region R1. Meanwhile, in FIG. 13, it is expressed that the first region R1 is limited only to the periphery of a point where the lower surface of the taper holder 210 and the spindle 200 contact each other, but the present invention is not limited thereto.

Figure 14:
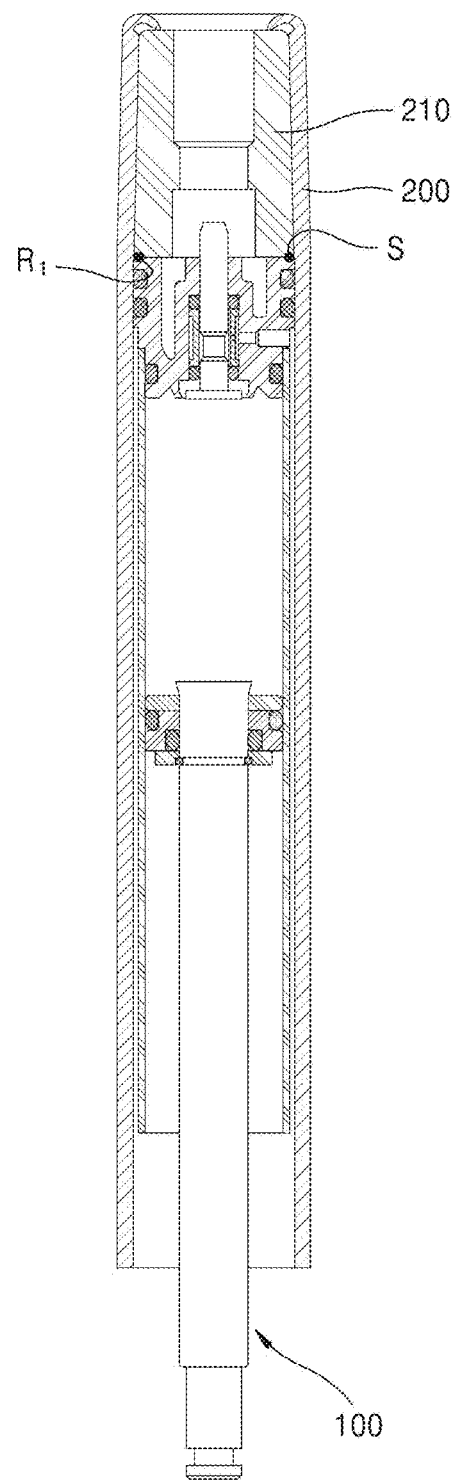

Referring to FIG. 14, a step of inserting the cylinder assembly 100 in contact with the spindle inner surface 200IS into the spindle 200 is performed. Herein, a liquid sealant S is applied to the boundary between the upper surface of the cylinder assembly 100, the spindle 200, and the lower surface of the taper holder 210, with reference to FIG. 14.

Figure 15:
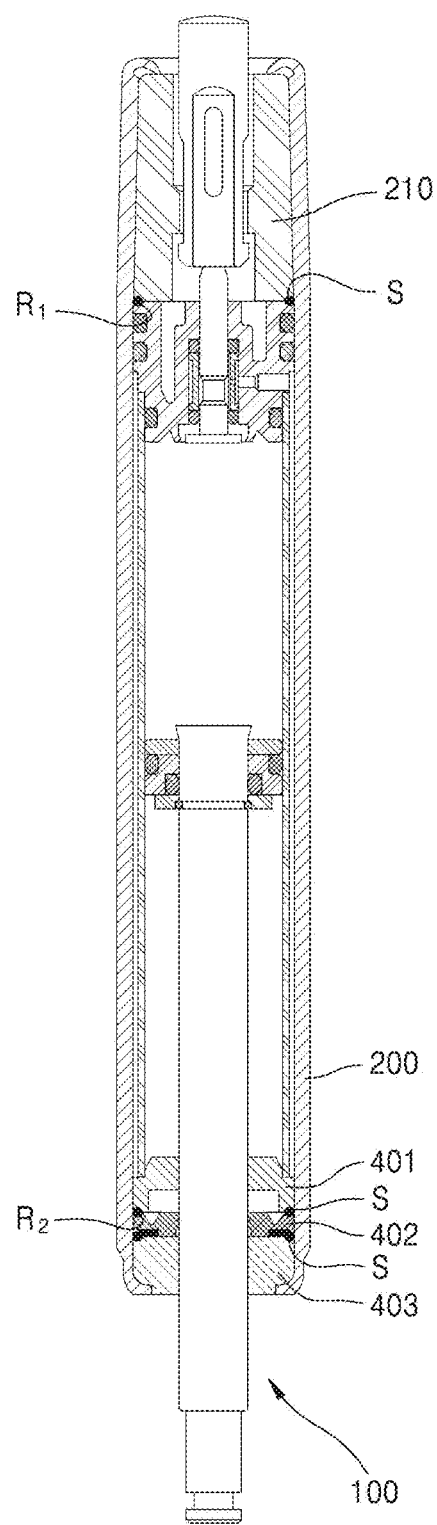

Then, a step of applying a liquid sealant S to the second region R2 of the inner surface 200IS of the spindle located under the cylinder assembly 100 is performed. Referring to FIG. 15, an open holder 401, a gas sealing member 402, and a flange 403 are sequentially inserted similar to those described in the contents related to FIGS. 6 to 12. In this case, the sealant S may be applied to the lower side of the cylinder 110 based on FIG. 15. That is, the step of applying sealant (S) may be performed at least once i) between the step of inserting the cylinder assembly 100 and the step of inserting open holder 401, ii) between the step of inserting open holder 401 and the step of inserting gas sealing member 402, and iii) between the step of inserting the gas sealing member 402 and the step of inserting the flange 403. FIG. 15 illustrates that the steps of applying the sealant S are respectively performed in steps ii) and iii) described above, but the present invention is not limited thereto.

Figure 16:
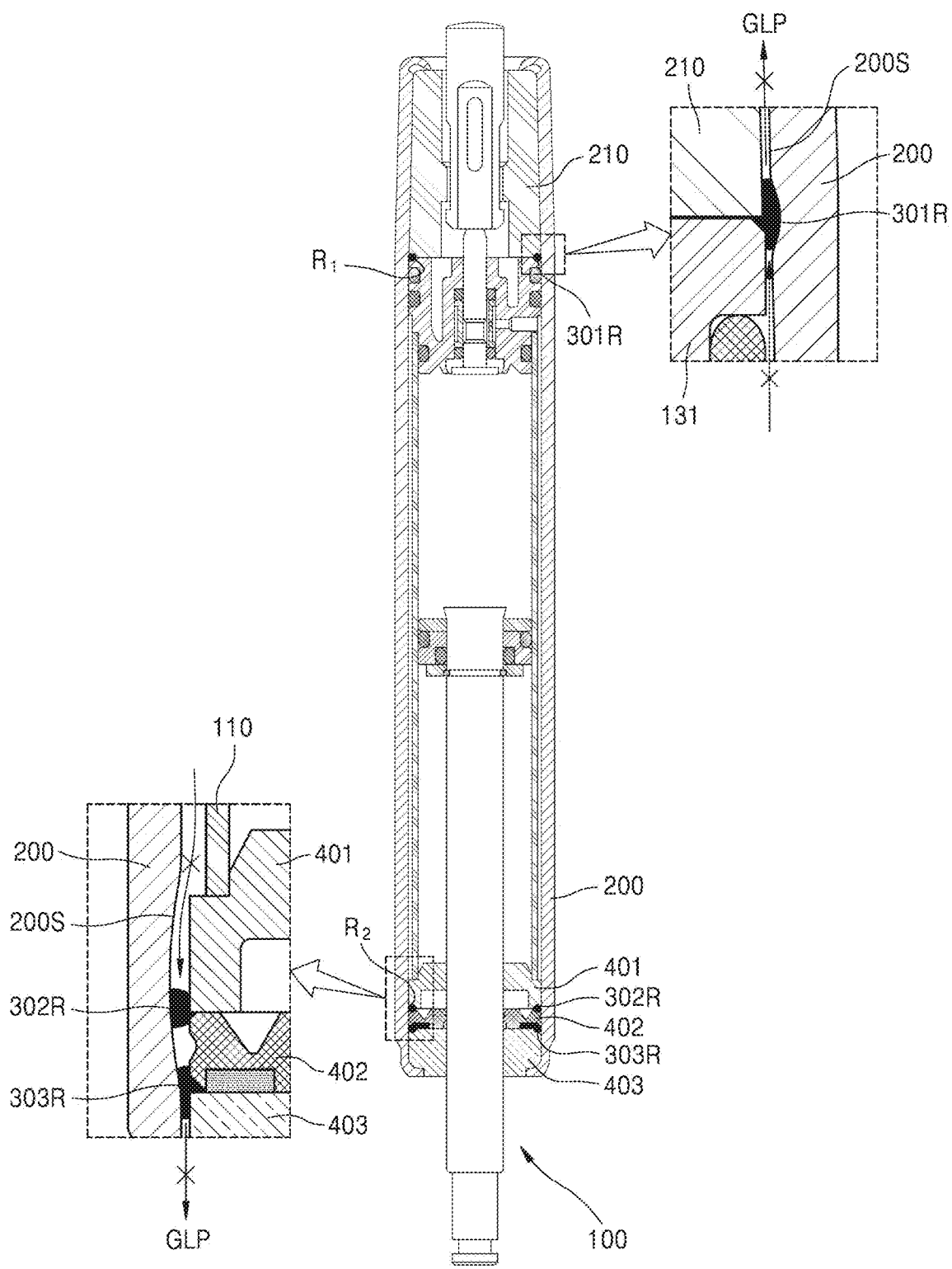

Referring to FIG. 16, a step of forming a first cured film ring 301R and a second cured film ring 302R by hardening the sealant S is performed. Since the sealant S is sealed by the flange 403 and the tapered holder 210, the hardening step may be performed under anaerobic conditions. The hardening step may be performed at room temperature for about 24 hours, but the present invention is not limited thereto.

When the hardening step is completed, solid cured film rings 301R and 302R are formed on the inner surface of the spindle 200 as shown in FIG. 16. Herein, referring to the enlarged view of the top of FIG. 16, the first cured film ring (301R) fills the gap between the pipe holder assembly 130 and the cylinder 110 and between the taper holder 210 and the cylinder 110, due to the scratch 200S formed on the spindle inner surface 200IS. As a result, the gas outlet passage GLP through which gas may leak is blocked by the first cured film ring 301R.

Meanwhile, referring to the enlarged view lower portion shown in FIG. 16, even when a scratch 200S is formed around the cylinder 110 and the open holder 401, the second cured film ring 302R placed below the cylinder 110 fills at least a portion of the gap formed by the scratch 200S. Meanwhile, a third cured film ring 303R may be placed under the gas sealing member 402. The second cured film ring 302R and the third cured film ring 303R double fill the gap formed by the scratch 200S. Accordingly, the upper gas leak passage GLP through which gas may leak is blocked by the first cured film ring 301R, and the lower gas leak passage GLP is blocked by the second cured film ring 302R (and the third cured film ring 303R).

On the other hand, in the enlarged view of FIG. 16, for convenience of explanation, the gaps between the spindle 200 and the taper holder 210, the cylinder assembly 100, the open holder 401, and the gas sealing member 402 are exaggerated than it actually is.

After the hardening process is completed, gas is injected into the cylinder 110 to complete the gas cylinder manufacturing process.

According to the gas cylinder manufacturing method according to an embodiment of the present invention, it is possible to minimize a phenomenon in which the pressure inside the cylinder 110 decreases over time by blocking the gap in the upper part and the gap in the lower part of the cylinder assembly 100 through the cured film cylinder 301C and the cured film ring 301R, 302R, and 303R to prevent the gas from leaking through the chamber C between the cylinder 110 and the spindle 200.

In order to confirm the effect of the present invention, the present inventors measured changes in gas pressure over time of a conventional gas cylinder and a gas cylinder manufactured according to the manufacturing method according to an embodiment of the present invention in units of about a week from 2017 Nov. 9 to 2018 Jan. 6. The conventional gas cylinders and the gas cylinders of the present invention used in the experiment were 15 respectively. A negative(−)-shaped (that is, straight-shape) scratch 200S was formed on the inner surface of the spindle 200IS of all gas cylinders.

Figure 17:
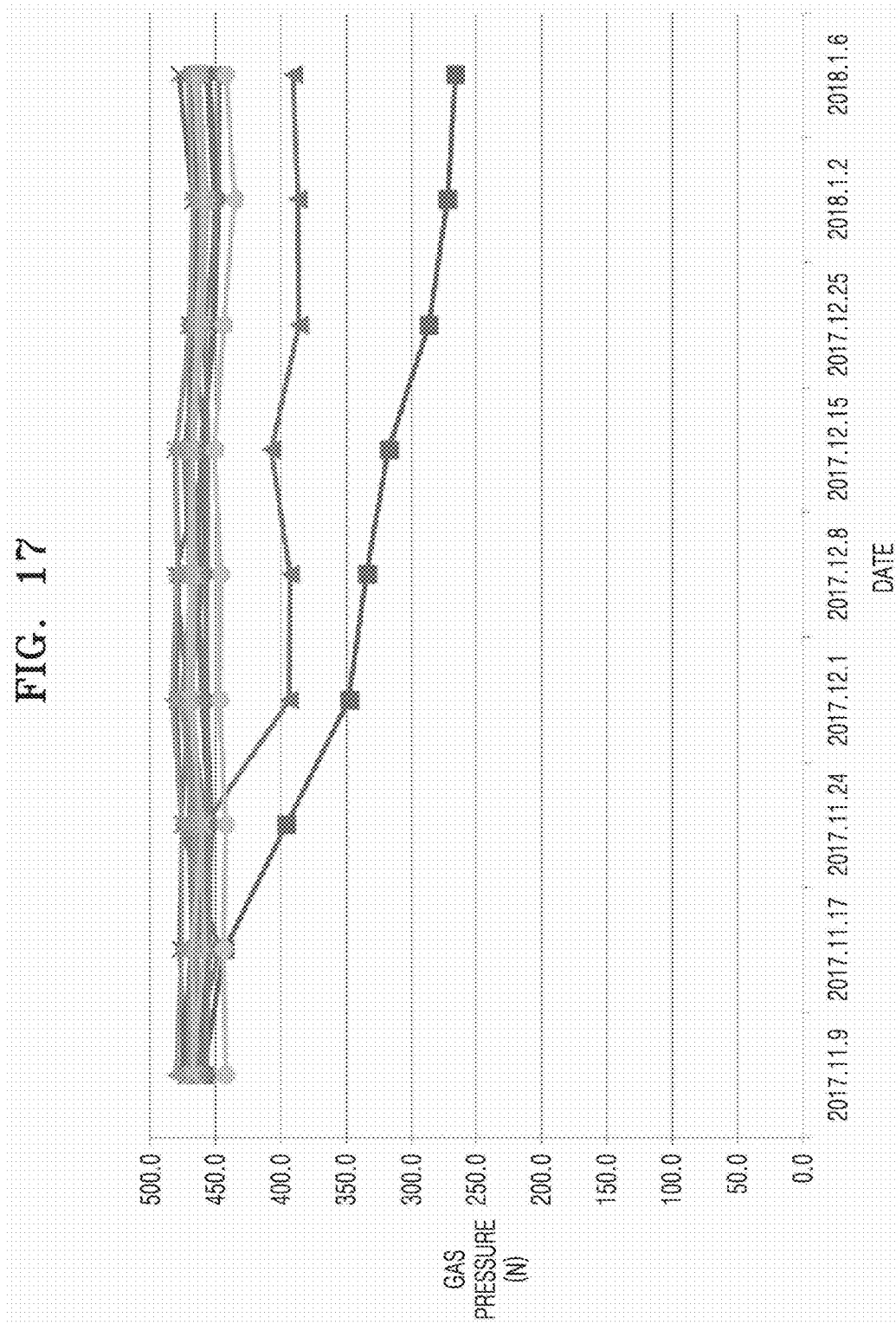
FIGS. 17 and 18 are graphs showing changes in gas pressure over time of a conventional gas cylinder and a gas cylinder manufactured according to a manufacturing method according to an embodiment of the present invention, respectively.
Figure 18:
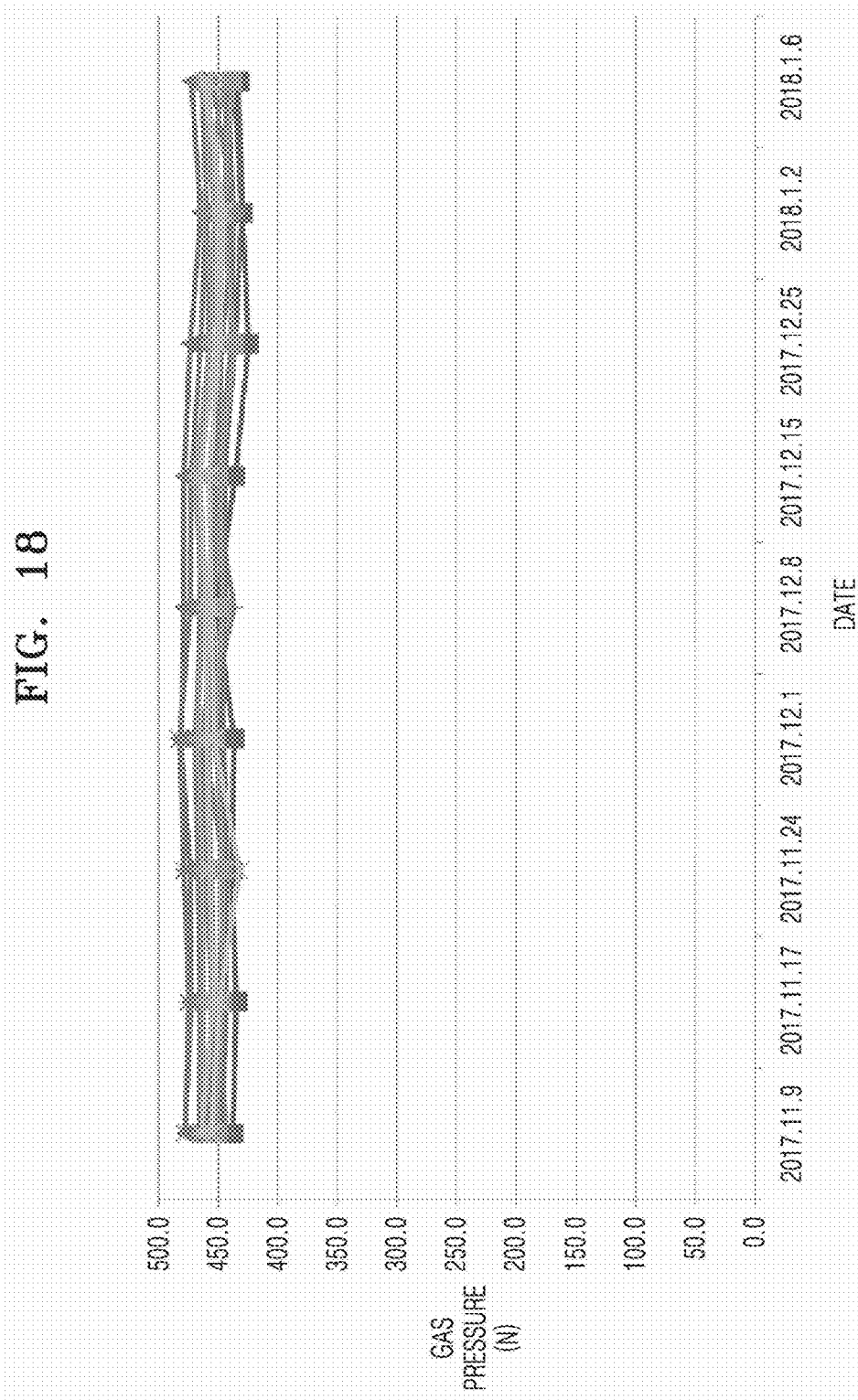

FIGS. 17 and 18 are graphs illustrating changes in gas pressure over time of a conventional gas cylinder and a gas cylinder manufactured according to a manufacturing method according to an embodiment of the present invention, respectively.

Referring to FIG. 17, 13 of the 15 conventional gas cylinders maintained a constant gas pressure, but for two, the gas pressure decreased over time. That is, in the case of a conventional gas cylinder, a gas leakage phenomenon was found in about 13% of gas cylinders. Meanwhile, referring to FIG. 18, the gas pressure of all 15 gas cylinders of the present invention was maintained constant for 2 months. That is, it was confirmed that the defect rate of the gas cylinder may be reduced by about 13% by using the manufacturing method of the present invention.

Figure 19:
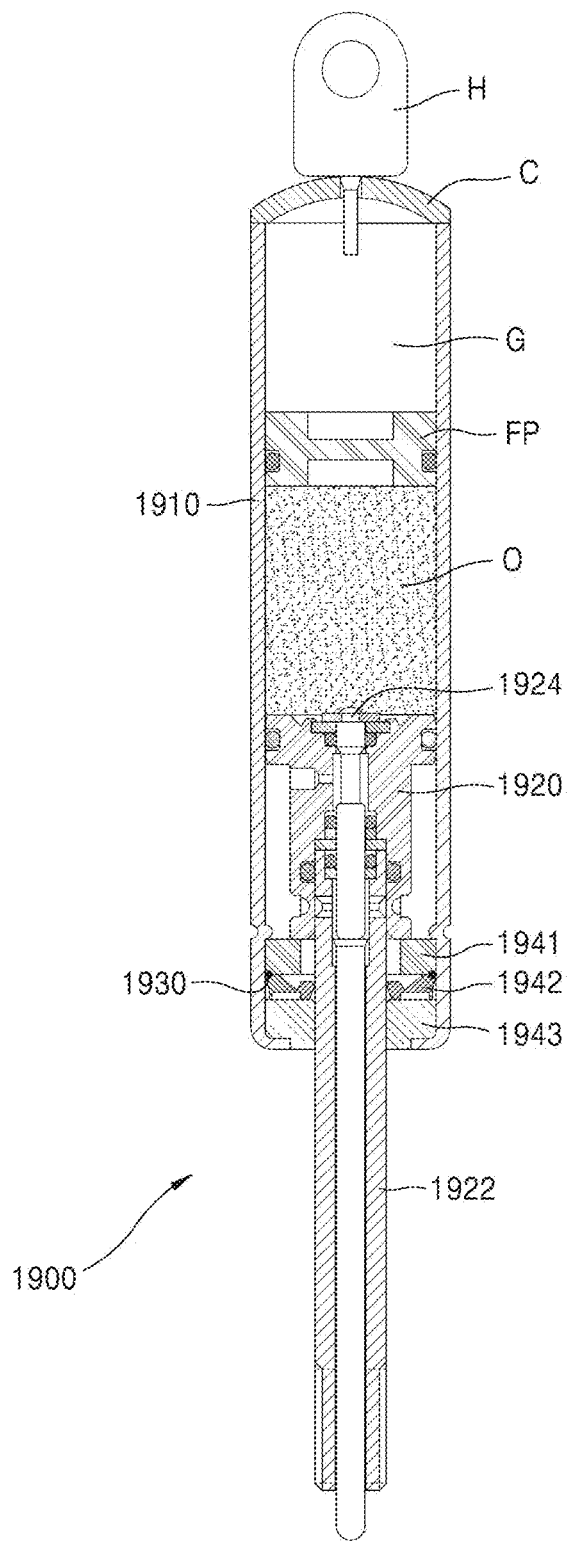
FIGS. 19 to 21 are cross-sectional views showing a lock type gas spring according to an embodiment of the present invention, respectively.
Figure 20:
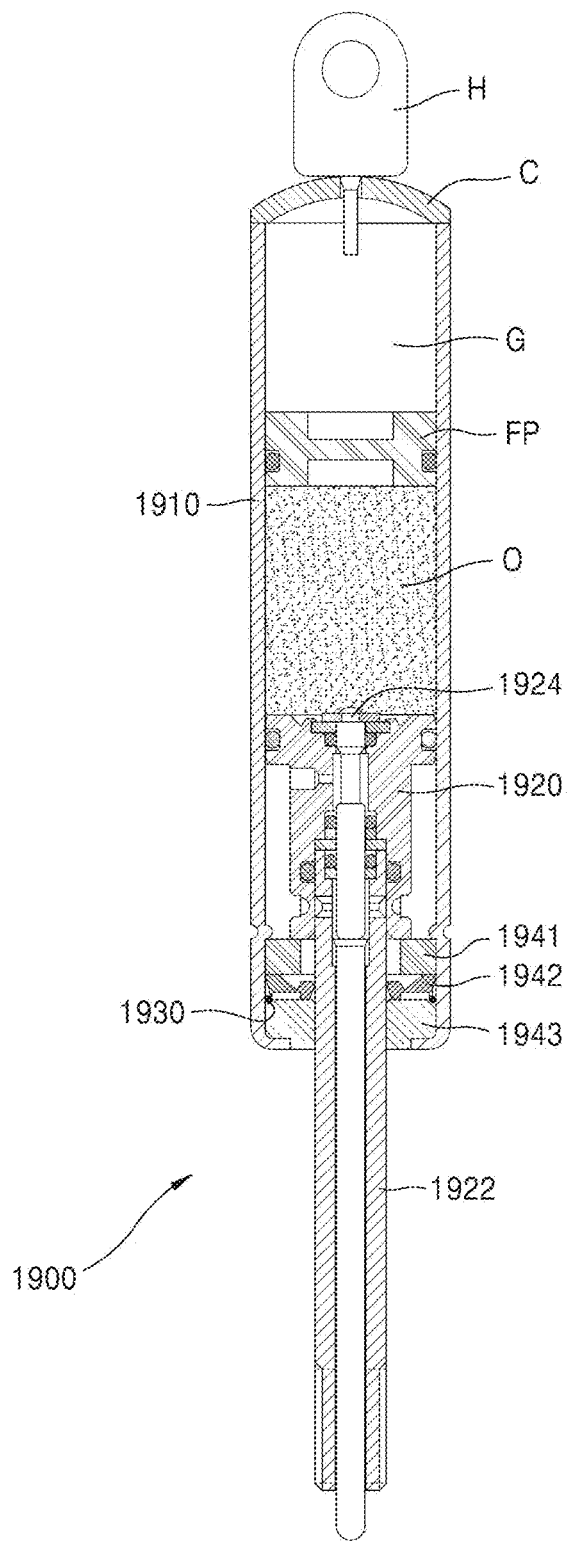
Figure 21:
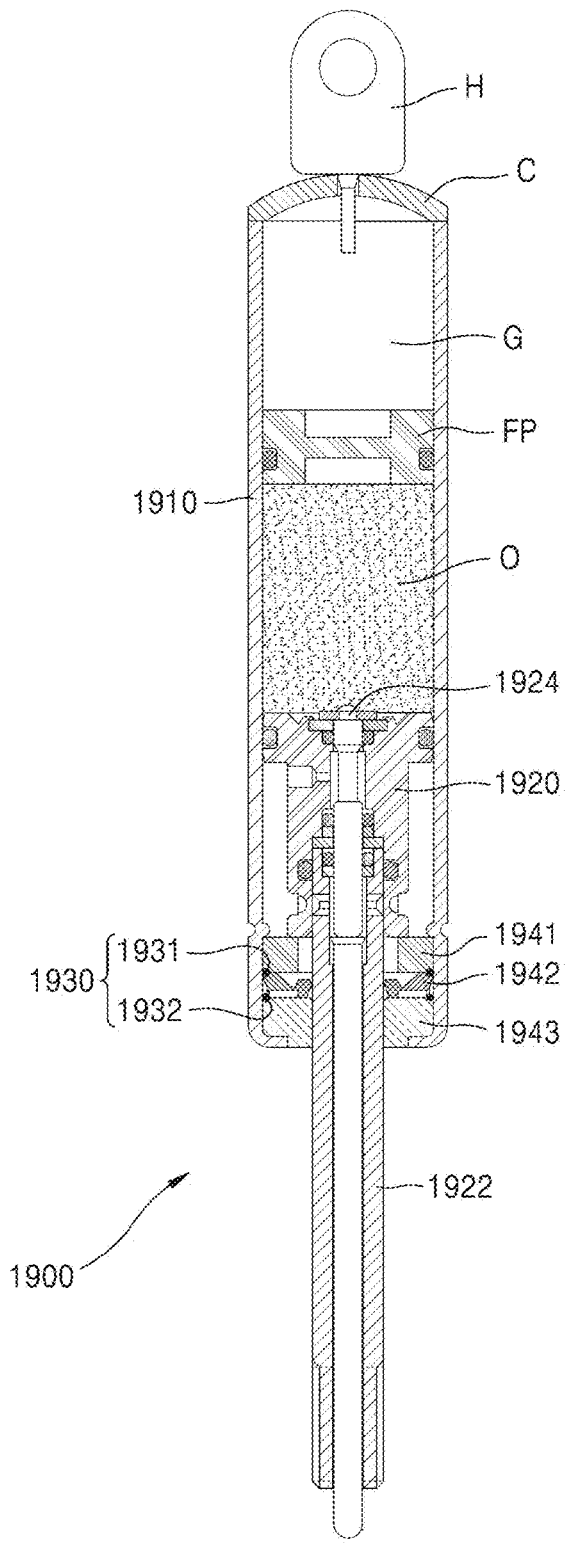

FIGS. 19 to 21 are cross-sectional views each showing a lock type gas spring according to an embodiment of the present invention. Gas springs may be classified into a lock type that allows the user to position the piston at the desired position by controlling the inflow and outflow of gas using components such as valves and a free type in which a force is always applied in a tensioned direction because the inflow and outflow of gas cannot be controlled. The gas spring may be distinguished from a gas cylinder in that a component that controls the inflow and outflow of gas is located on the piston or is not present at all.

The gas spring 1900 according to an embodiment includes a hollow cylinder 1910, a piston rod assembly 1920, a spacer 1941, a gas sealing member 1942, and a flange 1943.

Referring to FIG. 19, the cylinder 1910 may have a hollow tubular shape. One end of the cylinder 1910 may be sealed by a cap C, and the cap C may be connected to other external components through a hinge H.

Inside the cylinder 1910, a piston rod assembly 1920 capable of reciprocating motion may be inserted. The piston rod assembly 1920 includes an elongated tubular piston rod 1922 and a valve 1924 for controlling the inflow and outflow of gas. One end of the piston rod assembly 1920 may be in contact with the inner surface of the cylinder 1910. Referring to FIG. 19, the upper portion of the piston rod may be filled with compressed gas G and oil O. On the other hand, optionally, a free piston FP may be placed on the upper portion of the piston rod assembly 1920, wherein the free piston FP separates the area filled with compressed gas G and the area filled with oil O.

After the piston rod assembly 1920 is inserted, one point of the cylinder 1910 may be drawn inward to determine a top dead center. That is, a point on the inner surface of the cylinder 1910 may protrude inward. In this state, when the spacer 1941 with a hole in the center is inserted into the cylinder 1910, the spacer 1941 is caught on the protruding point of the cylinder 1910, and the position of the spacer 1941 may be maintained.

Meanwhile, the gas sealing member 1942 in contact with the spacer 1941 may be inserted under the spacer 1941. The gas sealing member 1942 serves to block the entrance and exit of gas inside and outside of the cylinder 1910. The gas sealing member 1942 also has a ring shape with a hole in the center, and the piston rod assembly 1920 may reciprocate through a hole formed in the gas sealing member 1942.

Thereafter, the flange 1943 in contact with the gas sealing member 1942 may be inserted under the gas sealing member 1942. The flange 1943 may block the inlet of the cylinder 1910. After the flange 1943 is inserted, the region around the inlet portion of the cylinder 1910 may be curled to conform to the shape of the outer surface of the flange 1943.

Referring to FIG. 19, the cured film ring 1930 may be placed between the spacer 1941 and the gas sealing member 1942. For example, the cured film ring 1930 may be formed by inserting the spacer 1941 and then hardening after applying a sealant to the boundary between the lower surface of the spacer 1941 and the inner surface of the cylinder 1910.

Referring to FIG. 20, the cured film ring 1930 may be placed between the gas sealing member 1942 and the flange 1943. For example, the cured film ring 1930 may be formed by inserting the gas sealing member 1942 and then hardening after applying a sealant to the boundary between the lower surface of the gas sealing member 1942 and the inner surface of the cylinder 1910.

Referring to FIG. 21, the cured film ring 1930 may be placed both between the spacer 1941 and the gas sealing member 1942 and between the gas sealing member 1942 and the flange 1943. That is, the gas spring according to an embodiment may include a first cured film ring 1931 placed between the spacer 1941 and the gas sealing member 1942 and a second cured film ring 1932 placed between the gas sealing member 1942 and the flange 1943.

In FIGS. 19 to 21, it is illustrated that one spacer 1941 and one gas sealing member 1942 are placed, but a plurality of spacers 1941 and a plurality of gas sealing members 1942 may be disposed. In this case, the cured film ring may be placed on at least some of boundary surfaces of the plurality of gas sealing members 1942.

That is, when the spacer 1941, the gas sealing member 1942, and the flange 1943 are sequentially inserted into the cylinder 1910, the step of applying sealant S may be performed at least once i) between the step of inserting the spacer 1941 and the step of inserting the gas sealing member 1942 and ii) the step of inserting the gas sealing member 1942 inserting and the step of inserting the flange 1943.

When a step of hardening is completed, a solid cured film ring 1930 is formed on the inner surface of the cylinder 1910. Accordingly, a gas outlet passage (not shown) due to a scratch (not shown) formed in the cylinder 1910 is blocked by the cured film ring 1930.

Figure 22:
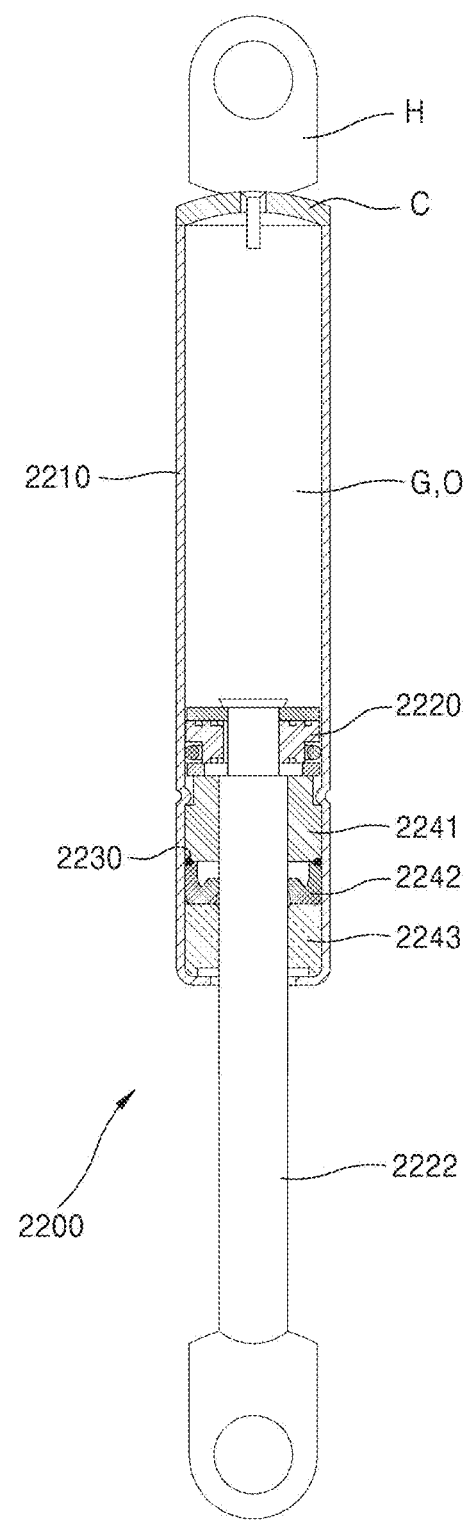
FIGS. 22 to 24 are cross-sectional views showing a free type gas spring according to an embodiment of the present invention, respectively.
Figure 23:
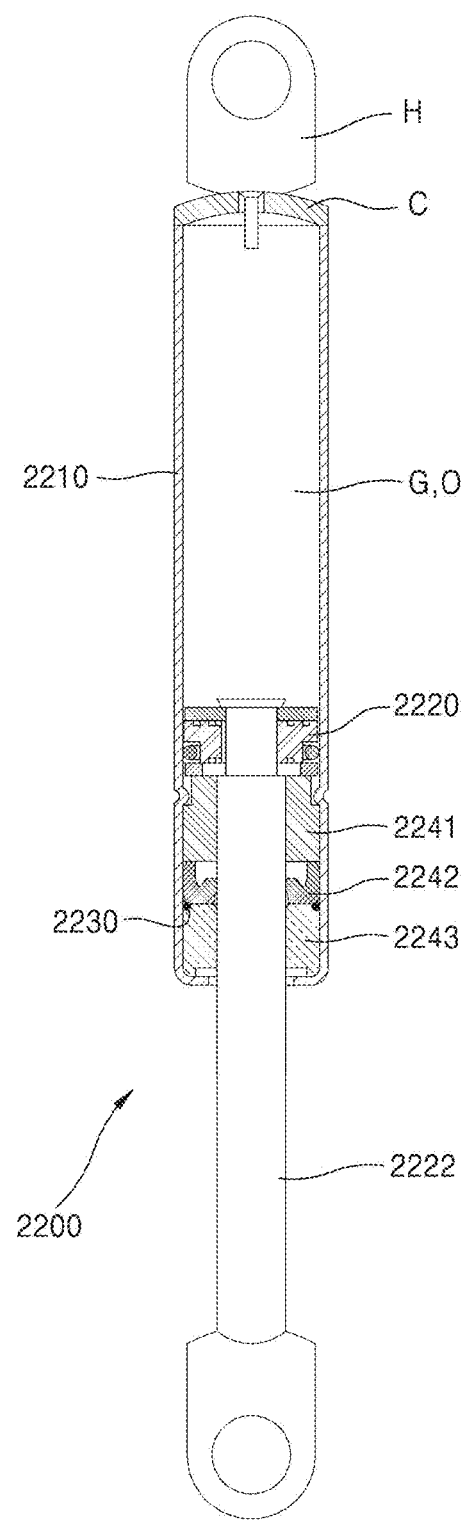
Figure 24:
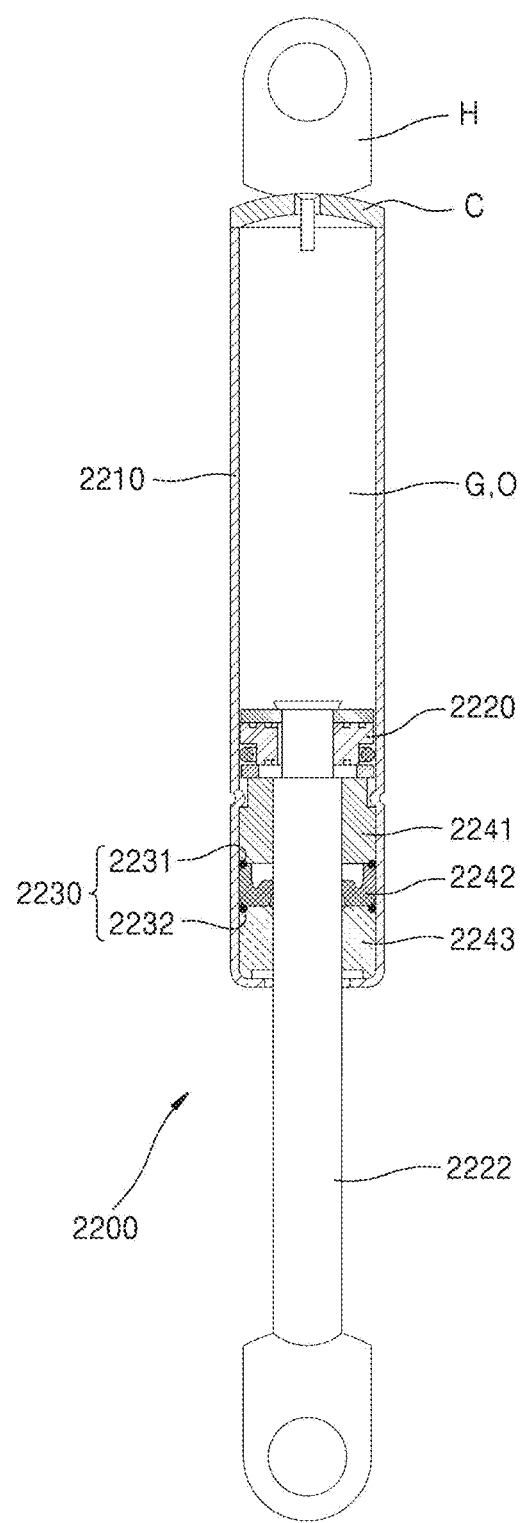

FIGS. 22 to 24 are cross-sectional views each showing a free type gas spring 2200 according to an embodiment of the present invention. The structure of the free type gas spring 2200 is similar to the above-described lock type gas spring 1900 except that it does not have a valve, and thus a detailed description thereof is omitted.

According to the method of manufacturing a gas spring according to an embodiment of the present invention, the gap under the piston rod assembly 1920 is blocked through the cured film rings 1930 and 2230 to prevent the gas from leaking out, thereby minimizing a phenomenon in which the pressure inside the cylinder 1910 decreases over time.

The present invention has been described with reference to the embodiments shown in the drawings, but these are merely exemplary, and those of ordinary skill in the art will appreciate that various modifications and equivalent other embodiments are possible therefrom. Therefore, the true technical scope of the present invention should be determined by the technical idea of the appended claims.

INDUSTRIAL APPLICABILITY

According to the present invention, there is provided a gas cylinder, a gas spring, and a manufacturing method thereof for preventing gas leakage. In addition, the embodiments of the present invention may be applied to a device that may fix a cylinder to a desired length or apply a force using hydraulic pressure, which is used industrially.

The invention claimed is:

1. A method of manufacturing gas cylinder, the method comprising:
   applying a sealant in a liquid state to at least a portion of inner surface of a hollow spindle;
   inserting a cylinder assembly contacting the inner surface of the spindle through an inlet of the spindle;
   forming a sealant film on an inner surface of the spindle by frictionally applying, via moving the cylinder assembly, the sealant in the liquid state to the inner surface of the spindle;
   after the forming of the sealant film, inserting an open holder into the spindle to be coupled with the cylinder assembly and the spindle;
   applying a sealant to a boundary between one end of the open holder and the inner surface of the spindle;
   after the applying of the sealant to a boundary between one end of the open holder and the inner surface of the spindle;
   inserting a gas sealing member into the spindle;
   applying the sealant to a boundary between one end of the gas sealing member and the inner surface of the spindle; and hardening the sealant film in the liquid state to form a cured film cylinder in contact with the inner surface of the spindle.

2. The method of claim 1, further comprising:
after the forming of the sealant film, applying the sealant to a lower portion of the inserted cylinder assembly.

3. The method of claim 1, wherein the liquid sealant is an anaerobic resin in liquid state.

4. The method of claim 3, wherein hardening the liquid sealant film comprises: blocking air to the liquid sealant film.

5. A gas cylinder comprising:
a hollow spindle;
a cured film cylinder extending axially and in contact with an inner surface of the spindle and formed by hardening a sealant;
an O-ring in contact with the inner surface of the spindle; and
a cylinder assembly including a cylinder spaced apart from at least a partial region of an inner surface of the cured film cylinder and the space extending axially.

6. A gas cylinder comprising:
a hollow spindle having an inner surface;
a first cured film ring and a second cured film ring placed in a first region and a second region of the spindle inner surface, respectively, and formed by hardening a sealant;
an O-ring in contact with the inner surface of the spindle; and
a cylinder assembly placed between the first cured film ring and the second cured film ring in the spindle.

7. The gas cylinder of claim 6, further comprising:
a tapered holder placed within a tapered interior of the spindle,
wherein the first cured film ring is located at a boundary between the tapered holder and the cylinder assembly.

8. The gas cylinder of claim 6, further comprising:
an open holder coupled with the cylinder assembly at an inlet of the spindle,
wherein the second cured film ring is located at a boundary between the open holder and the spindle.

9. A method of manufacturing gas cylinder, the method comprising:
inserting a piston rod assembly in contact with an inner surface of a cylinder into the hollow cylinder;
applying a sealant to an inlet portion of the inner surface of the cylinder;
inserting a gas sealing member into the inner surface of the cylinder; and
hardening the sealant to form a cured film ring in contact with the inner surface of the cylinder and the gas sealing member.

10. A gas spring comprising:
a hollow cylinder;
a piston rod assembly capable of reciprocating motion within the cylinder;
an O-ring in contact with an inner surface of the cylinder;
a spacer placed inside the cylinder to limit movement of the piston rod assembly;
a gas sealing member placed inside the cylinder and in contact with the spacer;
a flange in contact with the gas sealing member and blocking an inlet of the cylinder; and
a cured film ring placed between the spacer and the gas sealing member or between the gas sealing member and the flange and formed by curing a sealant to block a gas outlet passage.

* * * * *